(12) United States Patent
Ma et al.

(10) Patent No.: US 11,148,037 B2
(45) Date of Patent: *Oct. 19, 2021

(54) SELF-BALANCING BOARD WITH PRIMARY WHEEL AND DISTAL AUXILIARY WHEEL

(71) Applicant: KOOFY INNOVATION LIMITED, Sheung Wan (CN)

(72) Inventors: Ondy Song Qi Ma, Kowloon (CN); Xiaodong Ge, Shenzhen (CN)

(73) Assignee: KOOFY INNOVATION LIMITED, Sheung Wan (HK)

( * ) Notice: Subject to any disclaimer, the term of this patent is extended or adjusted under 35 U.S.C. 154(b) by 13 days.

This patent is subject to a terminal disclaimer.

(21) Appl. No.: 16/459,597

(22) Filed: Jul. 1, 2019

(65) Prior Publication Data

US 2019/0321712 A1 Oct. 24, 2019

Related U.S. Application Data

(63) Continuation of application No. 16/115,534, filed on Aug. 28, 2018, now Pat. No. 10,335,669, which is a (Continued)

(30) Foreign Application Priority Data

Nov. 15, 2015 (WO) .................. PCT/IB2015/058821

(51) Int. Cl.
*A63C 17/12* (2006.01)
*A63C 17/08* (2006.01)
(Continued)

(52) U.S. Cl.
CPC ............ *A63C 17/12* (2013.01); *A63C 17/004* (2013.01); *A63C 17/014* (2013.01); *A63C 17/08* (2013.01);
(Continued)

(58) Field of Classification Search
CPC ... A63C 17/12; A63C 17/014; A63C 17/1409; A63C 2017/1463; A63C 17/14; A63C 2203/12; B62K 3/002; B62K 2202/00
See application file for complete search history.

(56) References Cited

U.S. PATENT DOCUMENTS 4,084,831 A * 4/1978 Akonteh ................ A63C 17/01
188/29
4,084,832 A 4/1978 Upshaw
(Continued)

FOREIGN PATENT DOCUMENTS

CN 2566908 Y 8/2003
CN 1689894 A 11/2005
(Continued)

*Primary Examiner* — Brian L Swenson
(74) *Attorney, Agent, or Firm* — Millman IP Inc.

(57) ABSTRACT

A self-balancing board is provided, comprising a primary wheel assembly, a platform, at least one sensor, a controller, a first auxiliary wheel assembly, and a first brake element. The primary wheel assembly comprises a primary wheel and a motor driving the primary wheel. The platform is secured to the primary wheel assembly and has a foot deck. The at least one sensor senses the orientation of the platform. The controller receives data from the at least one sensor and controls the motor in response to the received data. The first auxiliary wheel assembly is secured to the platform distal the primary wheel assembly, and is elevated from contacting a flat surface upon which the primary wheel rests when the foot deck is parallel to the flat surface. The first brake element is manually movable relative to the first auxiliary wheel assembly to engage the first auxiliary wheel assembly to provide resistance to rotation of the first auxiliary wheel assembly.

19 Claims, 9 Drawing Sheets

Related U.S. Application Data continuation of application No. 15/894,112, filed on Feb. 12, 2018, now Pat. No. 10,058,765, which is a continuation of application No. PCT/CN2016/105834, filed on Nov. 5, 2016.

(51) Int. Cl.

| | | |
|---|---|---|
| *A63C 17/00* | (2006.01) | |
| *A63C 17/26* | (2006.01) | |
| *B62L 1/04* | (2006.01) | |
| *B62H 1/12* | (2006.01) | |
| *B62K 3/00* | (2006.01) | |
| *B62K 11/00* | (2006.01) | |
| *A63C 17/14* | (2006.01) | |
| *A63C 17/01* | (2006.01) | |

(52) U.S. Cl.
CPC ...... *A63C 17/1409* (2013.01); *A63C 17/1418* (2013.01); *A63C 17/265* (2013.01); *B62H 1/12* (2013.01); *B62K 3/002* (2013.01); *B62K 11/007* (2016.11); *B62L 1/04* (2013.01); *A63C 2017/1463* (2013.01); *A63C 2203/12* (2013.01); *A63C 2203/18* (2013.01); *A63C 2203/24* (2013.01); *A63C 2203/42* (2013.01); *B62K 2202/00* (2013.01)

(56) References Cited

U.S. PATENT DOCUMENTS

| | | | | |
|---|---|---|---|---|
| 4,088,334 | A | * | 5/1978 | Johnson ................ A63C 17/01 188/2 R |
| 6,050,357 | A | * | 4/2000 | Staelin ................ B60L 3/0092 180/65.1 |
| 6,848,527 | B2 | * | 2/2005 | Nelson ................ A63C 17/004 180/180 |
| 7,172,044 | B2 | * | 2/2007 | Bouvet ................ A63C 17/12 180/15 |
| 9,908,580 | B2 | * | 3/2018 | Doerksen ............ A63C 17/016 |
| 2005/0241864 | A1 | | 11/2005 | Hiramatsu |
| 2008/0242515 | A1 | | 10/2008 | Odien |
| 2016/0296829 | A1 | * | 10/2016 | Sambeth ................ A63C 17/12 |
| 2017/0361205 | A1 | * | 12/2017 | Bigler ................ A63C 17/014 |

FOREIGN PATENT DOCUMENTS

| | | |
|---|---|---|
| CN | 102179039 A | 9/2011 |
| CN | 102309846 A | 1/2012 |
| CN | 202641989 U | 1/2013 |
| CN | 103191558 A | 7/2013 |
| CN | 203244743 U | 10/2013 |
| CN | 204017335 U | 12/2014 |
| CN | 204473001 U | 7/2015 |
| CN | 202179842 U | 4/2021 |
| DE | 29822628 U1 | 4/1999 |
| ES | 2221795 A1 | 1/2005 |
| GB | 2407780 A | 5/2005 |
| JP | 2005335677 A | 12/2005 |
| JP | 2006001384 A | 1/2006 |
| WO | 2001042077 A3 | 3/2002 |

\* cited by examiner

SELF-BALANCING BOARD WITH PRIMARY WHEEL AND DISTAL AUXILIARY WHEEL

CROSS-REFERENCE TO RELATED APPLICATIONS

This application is a continuation of, and claims the benefit of U.S. patent application Ser. No. 16/115,534 filed on Aug. 28, 2018, which is a continuation of and claims the benefit of U.S. patent application Ser. No. 15/894,112, filed on Feb. 12, 2018), which is a continuation of and claims the benefit of PCT/CN2016/105834, filed on Nov. 5, 2016, which is a continuation-in-part of, and claims the benefit of PCT Patent Application No. PCT/IB2015/058821, filed on Nov. 15, 2015, the contents of which are incorporated herein by reference in their entirety.

FIELD OF THE INVENTION

This invention relates to transportation vehicles for individuals, particularly a self-balancing board such as a device known as a one-wheeled skateboard which incorporates a motorized primary wheel.

BACKGROUND OF THE INVENTION

Self-balancing vehicles for transportation of individuals are known in the art. As described in U.S. Pat. No. 6,302,230B1 and AT299826 (Kamen), such vehicles are typically equipped with two coaxial, individually driven wheels, spaced apart and with a platform between, onto which a rider of the vehicle may stand facing in an intended forward direction of motion. Gyroscopic and accelerometer sensors detect changes in orientation of the platform and feed information to a motor control system. The motor system is programmed to maintain platform orientation horizontal within a certain range by rotating the wheels in any direction, having the effect of aligning the centers-of-gravity of the vehicle and the rider whilst the vehicle has a constant velocity. On some types, there is an upright handlebar connected to the platform, giving the rider ability to further control the vehicle by leaning sideways, whereby the wheels will rotate at different speeds and/or direction, causing the vehicle to turn.

Another variant of the above-described self-balancing vehicle is taught by U.S. Pat. No. 8,738,278B2 (Chen) in which a vehicle has two spaced, individually powered wheels that are controlled by a motor control system, with a platform between which is split laterally in two halves. Each half of the platform is associated with one wheel and its motor control system, and corresponds to the position of left and right feet of a rider of the vehicle. The two halves are pivotally coupled to one another, whereby the rider can control the relative speed and rotation direction of the two wheels independently using their feet to tilt the two platform sections. One benefit of this type of self-balancing vehicle is the lack of need for an upright handlebar, making the unit smaller and maneuverable without using the hands.

A third type of self-balancing vehicle disclosed by US20110220427A1 (Chen) a single large wheel and footrests on either side of the wheel. Friction pads extending upwards from each footrest are designed to give the rider more stability and comfort by providing support to the inside of the rider's calves.

A fourth type of self-balancing vehicle has a single wheel and a platform shaped like that of a skateboard. The rider places one foot on each side of a centrally positioned single wheel, and the intended direction of travel is sideways relative to the orientation of the rider. U.S. Pat. No. 9,101,817 Doerksen describes such a vehicle. There are also developments described in the art towards the safety aspects of this type of vehicle. Although the nature of an electric DC motor is that it can also be used in reverse as a brake, whereby the motor is used as a dynamo and electric energy is generated, more braking power may be desired. CN103191558A (Chu) describes a similar self-balancing board with a separate brake mechanism acting on the single central wheel, thereby increasing the braking power. U.S. Pat. No. 7,811,217 (Odien) discloses a self-balancing board with dual centrally positioned wheels, each having a brake associated with it. U.S. Pat. No. 7,424,927B2 (Hiramatsu) also describes a self-balancing board with a single central wheel, having auxiliary wheels in front and back. The auxiliary wheels are used to sense board angle via contact with a surface, each auxiliary wheel having sensors to determine the time the board has spent in a certain max tilt angle and feed information to the motor controller in order to initiate a controlled deceleration of the motor, and thus the central wheel.

SUMMARY

According to an aspect, there is provided a self-balancing board, including a primary wheel assembly that includes a primary wheel and a motor driving the primary wheel. The board further includes a platform secured to the primary wheel assembly and having a foot deck, at least one sensor sensing the orientation of the platform, a controller receiving data from the at least one sensor and controlling the motor in response to the received data, a first auxiliary wheel assembly coupled to the platform distal the primary wheel assembly, the first auxiliary wheel assembly being elevated from contacting a flat surface upon which the primary wheel rests when the foot deck is parallel to the flat surface and being engaged with the flat surface upon which the primary wheel rests when the foot deck is tilted by a selected angle, so as to cooperate with the primary wheel to support the self-balancing board on the flat surface without triggering braking by the controller on the primary wheel, and a first brake element that is manually movable relative to the first auxiliary wheel assembly to engage the first auxiliary wheel assembly to provide resistance to rotation of the first auxiliary wheel assembly.

The self-balancing board can further comprise a first brake pedal being biased to a disengaged position and being movable to an engaged position in which the first brake element contacts the first auxiliary wheel assembly.

The first brake pedal can be coupled to the platform via a mechanical hinge.

The first brake pedal can be coupled to the platform via a living hinge.

The first brake element can comprise a first brake pad, the first brake element being linearly biased away from the first auxiliary wheel assembly, and wherein the first brake element can be manually moved towards the first auxiliary wheel assembly to cause the first brake pad to come into contact with the first auxiliary wheel assembly.

The first auxiliary wheel assembly can be biased away from the platform, and wherein pressure applied to the platform proximal to the first auxiliary wheel assembly when the first auxiliary wheel assembly urges the first auxiliary wheel assembly into contact with the first brake element.

The first auxiliary wheel assembly can comprise a first auxiliary wheel, and a first braking surface.

The first brake element can engage the first braking surface to provide resistance to rotation of the first auxiliary wheel assembly.

The self-balancing board can further include a second auxiliary wheel assembly coupled to the platform distal the primary wheel assembly, the second auxiliary wheel assembly being elevated from contacting a flat surface upon which the primary wheel rests when the foot deck is parallel to the flat surface, and a second brake element that is manually movable relative to the second auxiliary wheel assembly to engage the second auxiliary wheel assembly to provide resistance to rotation of the second auxiliary wheel assembly.

The self-balancing board can further comprise a second brake pedal being biased to a disengaged position and being movable to an engaged position in which the second brake element contacts the second auxiliary wheel assembly.

The second brake pedal can be coupled to the platform via a mechanical hinge.

The second brake pedal can be coupled to the platform via a living hinge.

The second brake element can comprise a second brake pad, the second brake element being linearly biased away from the second auxiliary wheel assembly, and wherein the second brake element can be manually urged towards the second auxiliary wheel assembly to cause the second brake pad to come into contact with the second auxiliary wheel assembly.

The second auxiliary wheel assembly can be biased away from the platform, and wherein pressure applied to the platform proximal to the second auxiliary wheel assembly when the second auxiliary wheel assembly urges the second auxiliary wheel assembly into contact with the second brake element.

The self-balancing board can further comprise a handle bar secured to the platform.

BRIEF DESCRIPTION OF THE DRAWINGS

Embodiments will now be described, by way of example only, with reference to the attached Figures, wherein.

DETAILED DESCRIPTION OF THE EMBODIMENTS

FIGS. 1, 2, 3a, 3b, 3c, and 3d show a self-balancing board 100 in accordance with an embodiment. Self-balancing board 100 has a platform 1 that is generally elongated and has a generally central opening in which a primary wheel assembly 2 is secured. Platform 1 has an upper surface 8 that includes two foot rests 9 on either side of primary wheel assembly 2 upon which a rider 7 stands. The plane generally extending through foot rests 9 defines a foot deck that happens to be coplanar with upper surface 8 in this embodiment.

Primary wheel assembly 2 includes a primary wheel 2a that protrudes out of the generally central opening both below and above platform 1. Accidental contact between the feet of rider 7 and primary wheel assembly 2 is generally prevented by fenders 6a and 6b extending from upper surface 8 of platform 1 and a wheel cover 5 spanning fenders 6a, 6b over primary wheel assembly 2. The axis of rotation of a wheel of primary wheel assembly 2 defines a z axis. An x axis is orthogonal to the z axis and is parallel to a flat surface upon which the wheel is rested on. As will be appreciated, self-balancing board 100 is driven by primary wheel assembly 2 in either direction along the x axis.

A first auxiliary wheel assembly 3a is rotationally coupled to a first end of platform 1, and a first brake pedal 4a is connected via a mechanical hinge to platform 1 to brake first auxiliary wheel assembly 3a. A second auxiliary wheel assembly 3b identical to first auxiliary wheel assembly 3a is rotationally coupled to a second end of platform 1, and a second brake pedal 4b is connected via a mechanical hinge to platform 1 to brake second auxiliary wheel assembly 3b.

Figure 1:
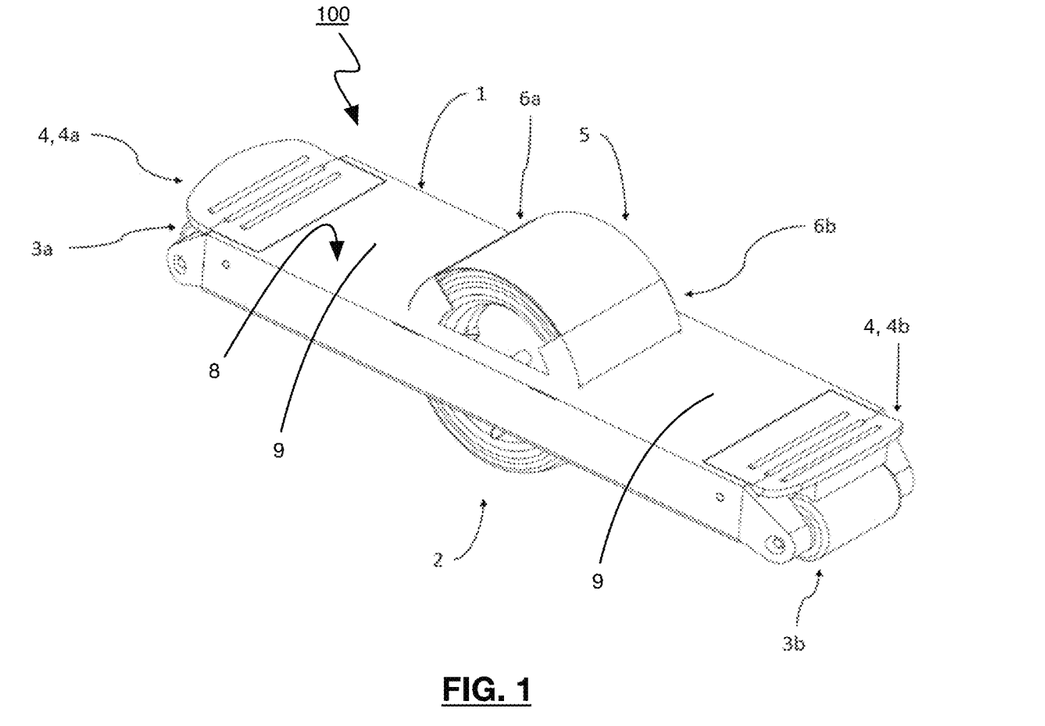
FIG. 1 is a side perspective view of a self-balancing board in accordance with an embodiment.
Figure 2:
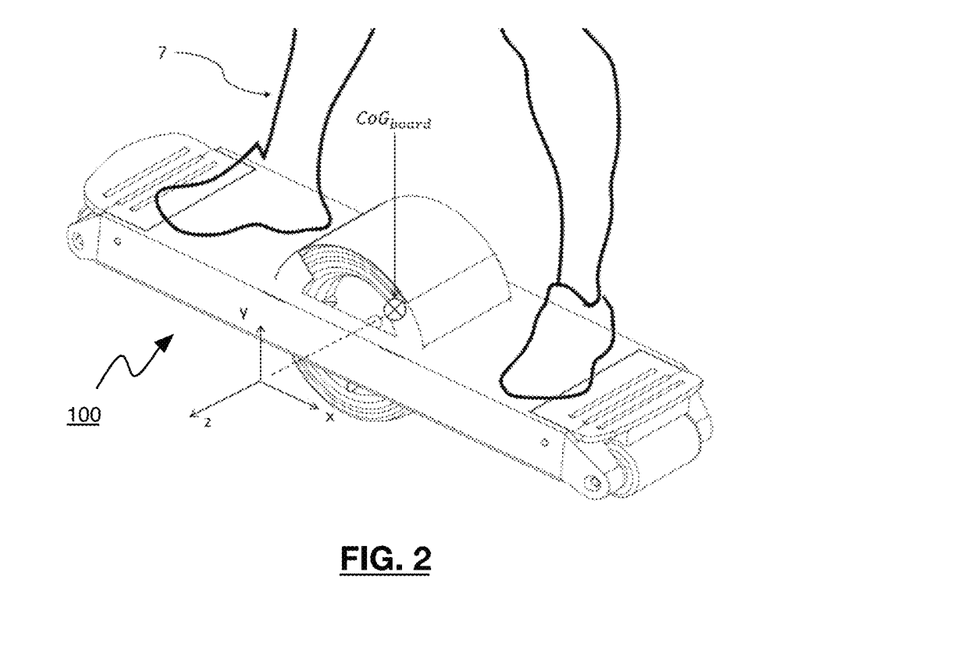
FIG. 2 is a side perspective view with a rider positioned atop of the self-balancing board of FIG. 1.
Figure 3A:
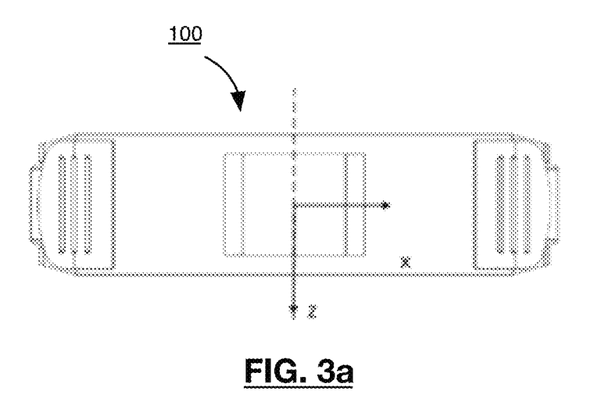
FIG. 3a is a top view of the self-balancing board of FIG. 1.
Figure 3B:
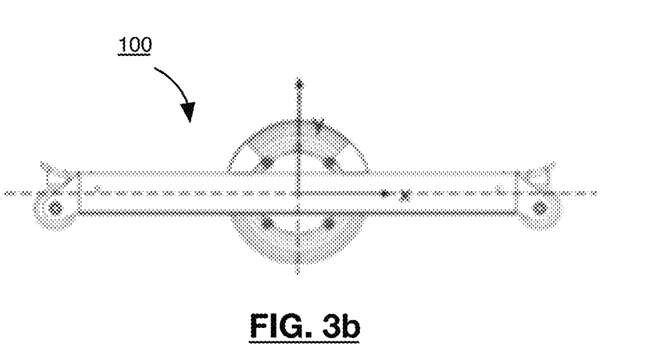
FIG. 3b is a side view of the self-balancing board of FIG. 1.
Figure 3C:
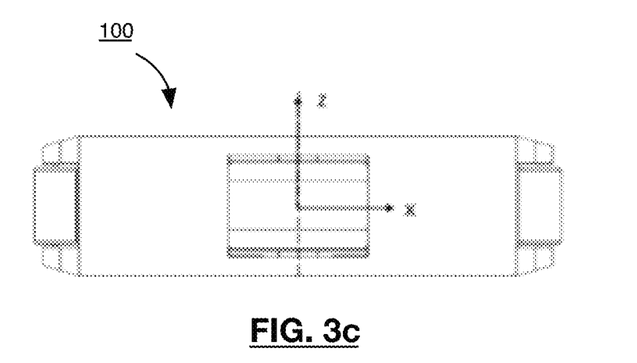
FIG. 3c is a bottom view of the self-balancing board of FIG. 1.
Figure 3D:
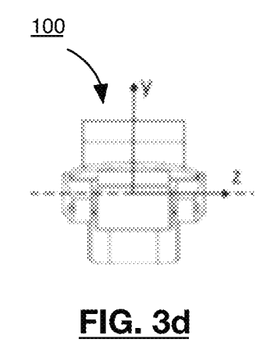
FIG. 3d is a rear view of the self-balancing board of FIG. 1.

As shown in FIG. 2, self-balancing board 100 enables a person to stand thereon straddling a centrally and symmetrically positioned wheel with his or her feet. Acceleration and deceleration of self-balancing board 100 can be controlled by placing more weight on one foot relative to the other, thus tilting self-balancing board 100. Sensors in self-balancing board 100 detect the orientation of the platform 1 and control a motor driving the wheel to accelerate or decelerate as needed to maintain the platform 1 in a generally level orientation.

Figure 4:
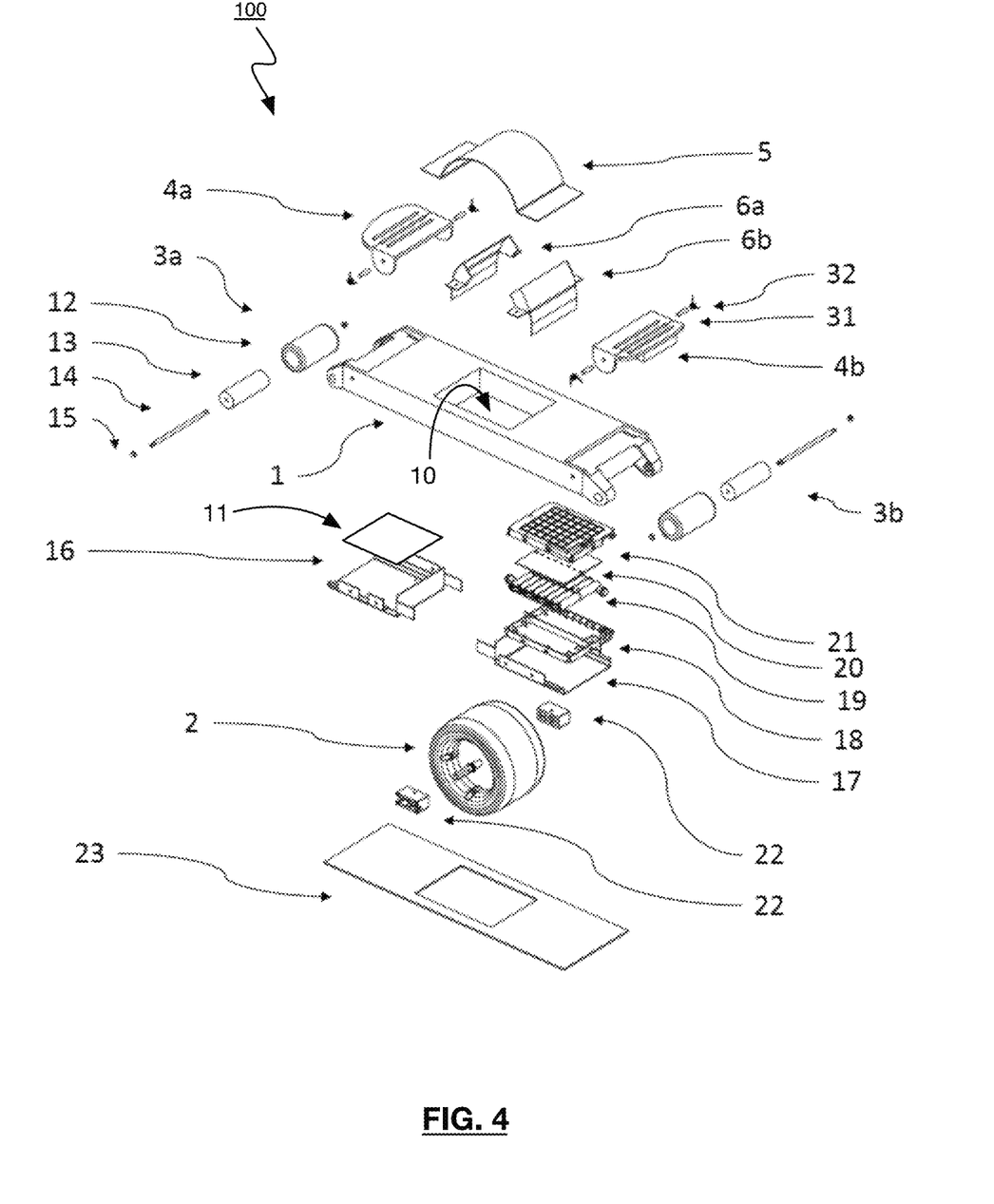
FIG. 4 is an exploded view of the self-balancing board of FIG. 1.

FIG. 4 illustrates various components of self-balancing board 100 in greater detail. Wheel cover 5 is secured to an underside of platform 1 and extends upwards within opening 10, after which primary wheel assembly 2 is secured within opening 10 via wheel shaft brackets 22. Fenders 6a, 6b are separate elements that are fastened to platform 1.

A controller board 11 having a controller and orientation sensors is located under platform 1 in a location provided by a PCB tray 16. A battery tray 17 provides location for a battery assembly that includes a lower battery cover 18, a battery 19, a battery PCB 20, and an upper battery cover 21. Battery 19 can be one or more batteries coupled together to provide power to self-balancing board 100. Battery PCB 20 controls the charging of and power flow provided by battery 19. Lower and upper battery covers 18 and 21 protect and isolate battery 19 and battery PCB 20 from physical damage and from electrical interference. Once PCB tray 16, battery tray 17, and primary wheel assembly 2 are secured to platform 1, a bottom cover 23 is secured to the bottom of platform 1.

Auxiliary wheel assemblies 3a and 3b are secured at ends of platform 1. Each of auxiliary wheel assembly 3a and auxiliary wheel assembly 3b includes an elongated auxiliary wheel 12, an auxiliary wheel bearing member 13, an auxiliary wheel shaft 14, and wheel nuts 15. Elongated auxiliary wheel 12 is preferably made of a resilient material such as rubber. Auxiliary wheel bearing member 13 may be a bushing or a bearing. In embodiments wherein auxiliary wheel bearing member 13 is a bushing it is preferably made of a deformation-resistant material that is suitable as a bushing, such as certain selected types of plastic. Auxiliary wheel shaft 14 is preferably constructed from a suitable metal. Auxiliary wheel shafts 14 of auxiliary wheel assemblies 3a and 3b are secured to platform 1 via wheel nuts 15 at both ends. The profile of auxiliary wheels 12 is such that the auxiliary wheels 12 touch the ground before the platform 1 touches the ground when the platform 1 is tipped forward or rearward.

Coupled in a pivoting relation to platform 1 and close to auxiliary wheel assemblies 3a and 3b are brake pedals 4a and 4b. Each brake pedal 4a, 4b is mechanically hinged to platform 1 via hinge posts 31. Biasing members 32 (e.g. torsion springs) are positioned on hinge posts 31 and between brake pedals 4a, 4b and platform 1.

Figure 5:
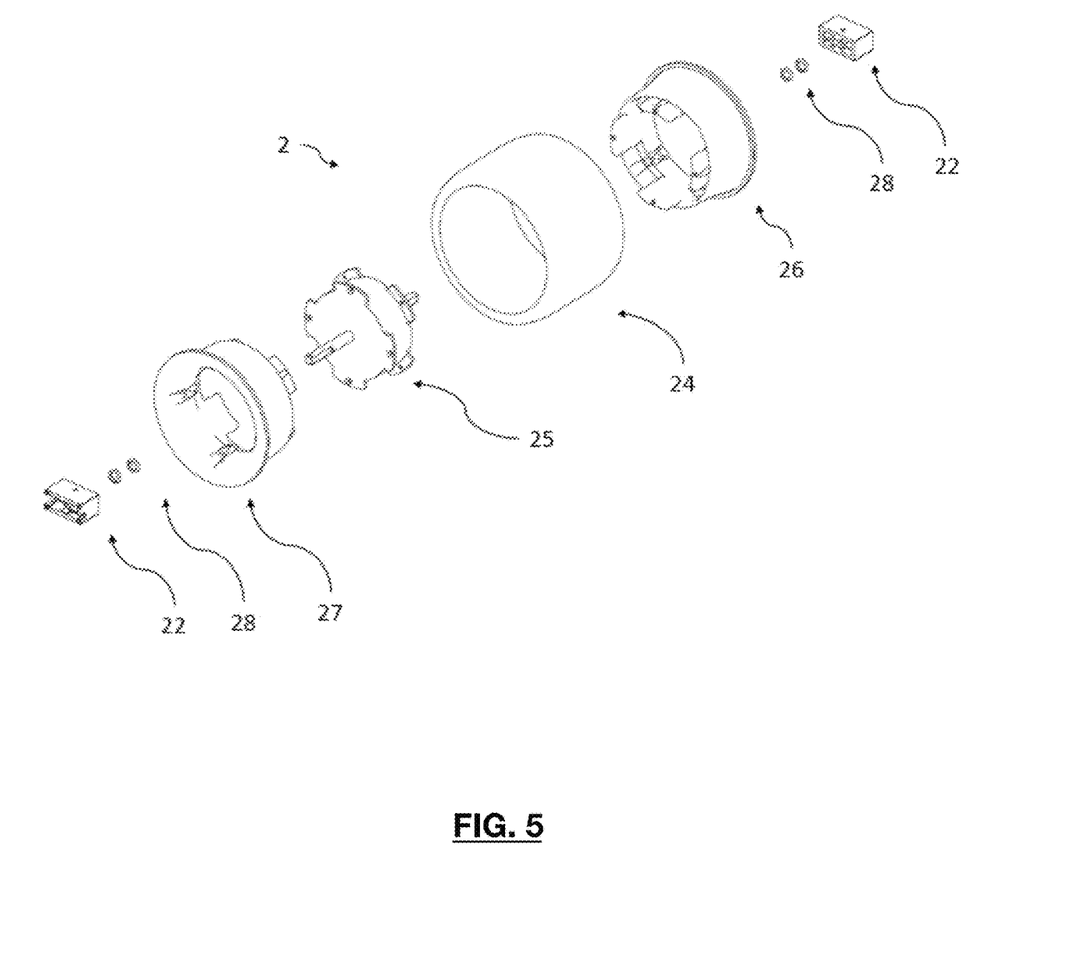
FIG. 5 is an exploded view of the wheel assembly of the self-balancing board of FIG. 1.

FIG. 5 illustrates various components of primary wheel assembly 2 in greater detail. Primary wheel assembly 2 includes a tire 24 that is made of a suitable rubber. A motor 25 is placed inside of tire 24 and is secured between two wheel hub sections 26, 27 that are dimensioned to fit tightly inside of tire 24 via friction-fit or by any other suitable connection structure. Motor 25 has an axel that is secured at each end to wheel shaft bracket 22 via wheel shaft nuts 28. Primary wheel assembly 2 is then secured to platform 1 via wheel shaft brackets 22. Power may be transmitted from the battery 19 to the motor 25 through a hollow shaft supporting the wheel assembly 2 on the platform 1. The motor 25 may be a hub motor that includes a central portion that is the stator and a radially outer portion that is a rotor and rotates about the stator.

Referring now to FIGS. 4 and 5, the controller uses orientation data provided by the orientation sensors for the platform 1 and controls motor 24 based on the orientation data. When the rider shifts their weight to one end of platform 1, thereby tilting platform 1 around the z axis, the controller controls motor 24 to accelerate self-balancing board 100 in the direction to which weight was shifted.

Figure 6A:
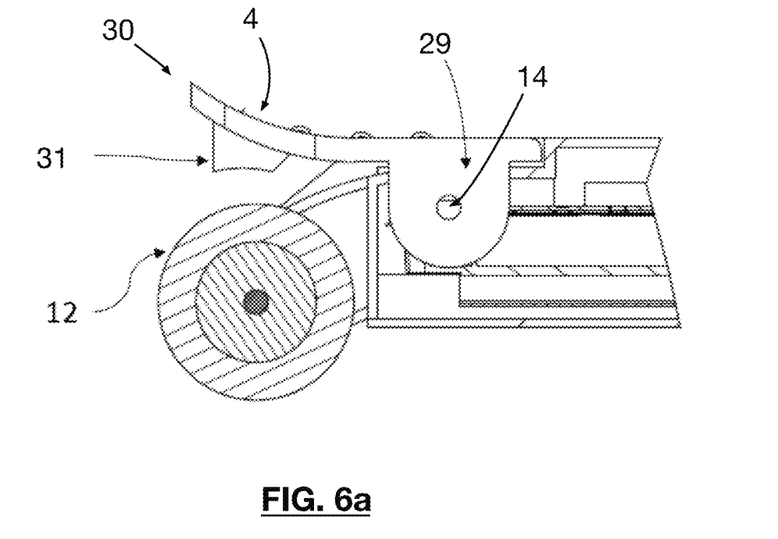
FIG. 6a is a side section view of the self-balancing board of FIG. 1 with the brake disengaged.
Figure 6B:
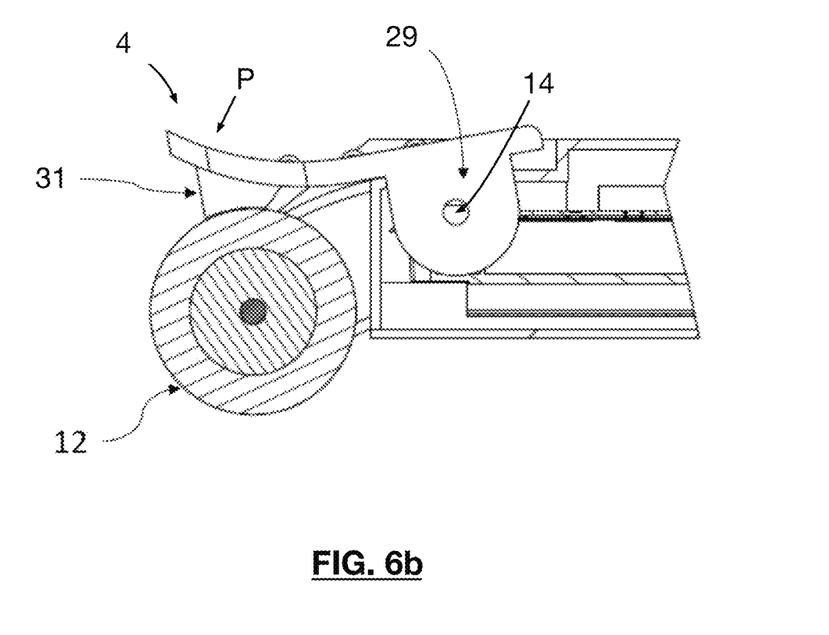
FIG. 6b is a side section view of the self-balancing board of FIG. 1 with the brake engaged.

FIG. 6a shows brake pedal 4 at either end of platform 1 of self-balancing board 100 in a disengaged position. Flanged portions 29 of brake pedal 4 receive auxiliary wheel shaft 14 through a hole, enabling an end 30 of brake pedal 4 to pivot therearound. Brake pedal 4 has a brake pad 31 on a surface of end 30 facing auxiliary wheel 12. When brake pedal 4 is not urged to pivot downwards (i.e., in a disengaged position), springs 32 bias end 30 and brake pad 31 of brake pedal 4 away from auxiliary wheel 12. When end 30 and brake pad 31 of brake pedal 4 are urged to pivot towards auxiliary wheel 12 by manual exertion of a force P on an opposite surface of end 30 into an engaged position, brake pad 31 engages auxiliary wheel 12 and the friction force between brake pad 31 and auxiliary wheel 12 works to brake auxiliary wheel 12, as shown in FIG. 6b. Upon termination of the force P, end 30 of brake pedal 4 is urged back into the position shown in FIG. 6a by springs 32.

Figure 7A:
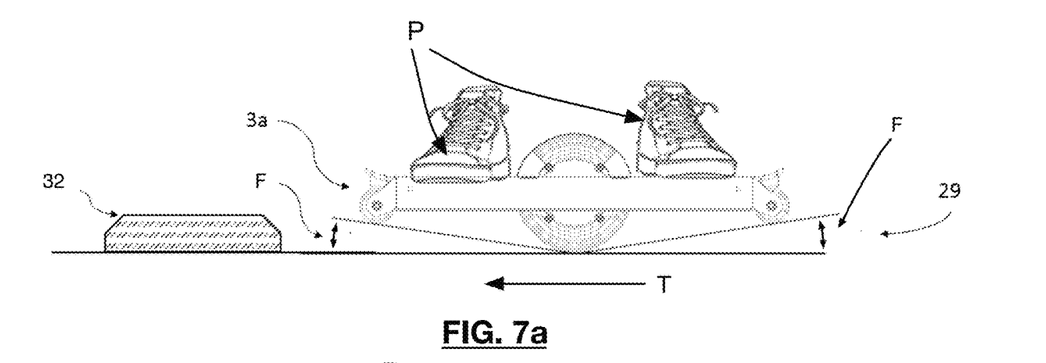
FIG. 7a is a side view of the self-balancing board of FIG. 1 in normal operation.

As shown in FIG. 7a, self-balancing board 100 has a freedom of movement F of approximately plus or minus eight degrees around the z axis (of the primary wheel) before auxiliary wheel 12 at either end of platform 1 contacts a flat surface upon which self-balancing board 100 is resting. The angle is found to be suitable for an intuitive use of the board but can vary depending on other factors relating to board performance.

Assuming a single direction of travel T for illustration, three main user situations are possible. Self-balancing board 100 can be in balance, as shown in FIG. 7a, during which its velocity, either zero or non-zero, is constant. In addition, auxiliary wheel assembly 3a enables a smooth transition when traversing uneven terrains, such as a speed bump 32.

Figure 7B:
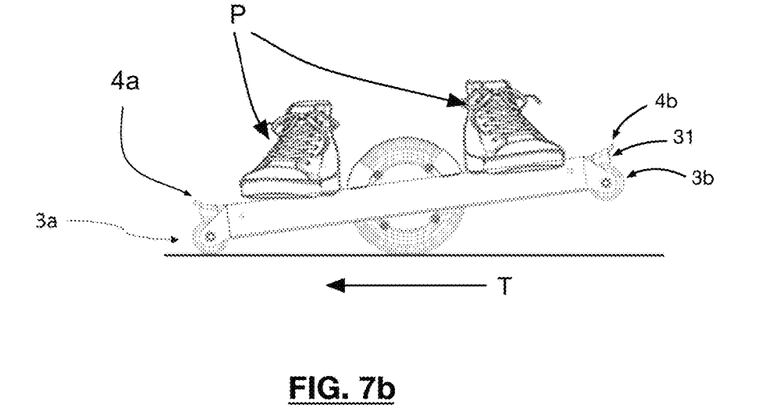
FIG. 7b is a side view of the self-balancing board of FIG. 1 in anti-fall mode.

As shown in FIG. 7b, weight can be shifted forward by the rider to tilt the leading end of platform 1 downwards up to eight degrees towards the surface over which self-balancing board 100 is traveling. When the controller receives orientation data from the orientation sensors on controller board 11 in this position, the controller directs motor 25 to accelerate self-balancing board 100 at full power in direction T and auxiliary wheel assembly 3a facilitates forward movement of self-balancing board 100. Brake pedal 4b and brake pad 31 are biased away from auxiliary wheel 3b towards a disengaged position by springs 32.

Figure 7C:
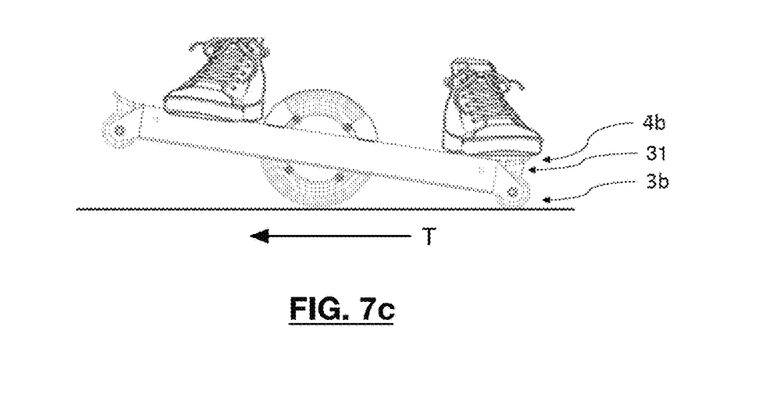
FIG. 7c is a side view of the self-balancing board of FIG. 1 in brake mode.

Alternatively, as shown in FIG. 7c, weight can be shifted backward by the rider to tilt the trailing end of platform 1 downwards eight degrees towards the surface over which self-balancing board 100 is traveling. When the controller receives orientation data from the orientation sensors on controller board 11 in this position, the controller directs motor 25 to decelerate self-balancing board 100, using the motor as a brake, at full power in the direction opposite of T, causing self-balancing board 100.

The rider can further increase deceleration of self-balancing board 100 by manually pressing down with their foot on brake pedal 4b to urge brake pedal 4b and brake pad 30 to an engaged position to engage auxiliary wheel assembly 3b. The braking force between brake pad 30 and auxiliary wheel assembly 3b is proportional to the manual force applied to brake pedal 4b, and self-balancing board 100 can be brought to a more rapid stop than if only relying on the motor brake provided by motor 25.

As will be appreciated, motor 24 of self-balancing board 100 can operate both clockwise or counterclockwise, so that self-balancing board 100 can travel in the direction opposite of T. In this reverse direction, the same principles are applied by self-balancing board 100. Tilting of the leading end of platform 1 towards the surface being traveled over causes the controller to direct motor 24 to accelerate in that direction. Similarly, tilting of the trailing end of platform 1 towards the surface being traveled over causes the controller to direct motor to decelerate. The rider 7 can further increase deceleration of self-balancing board 100 in the direction opposite of T by manually urging brake pedal 4a and brake pad 30 connected thereto to engage auxiliary wheel assembly 3a, thereby applying a mechanical braking force to auxiliary wheel assembly 3a.

Figure 8:
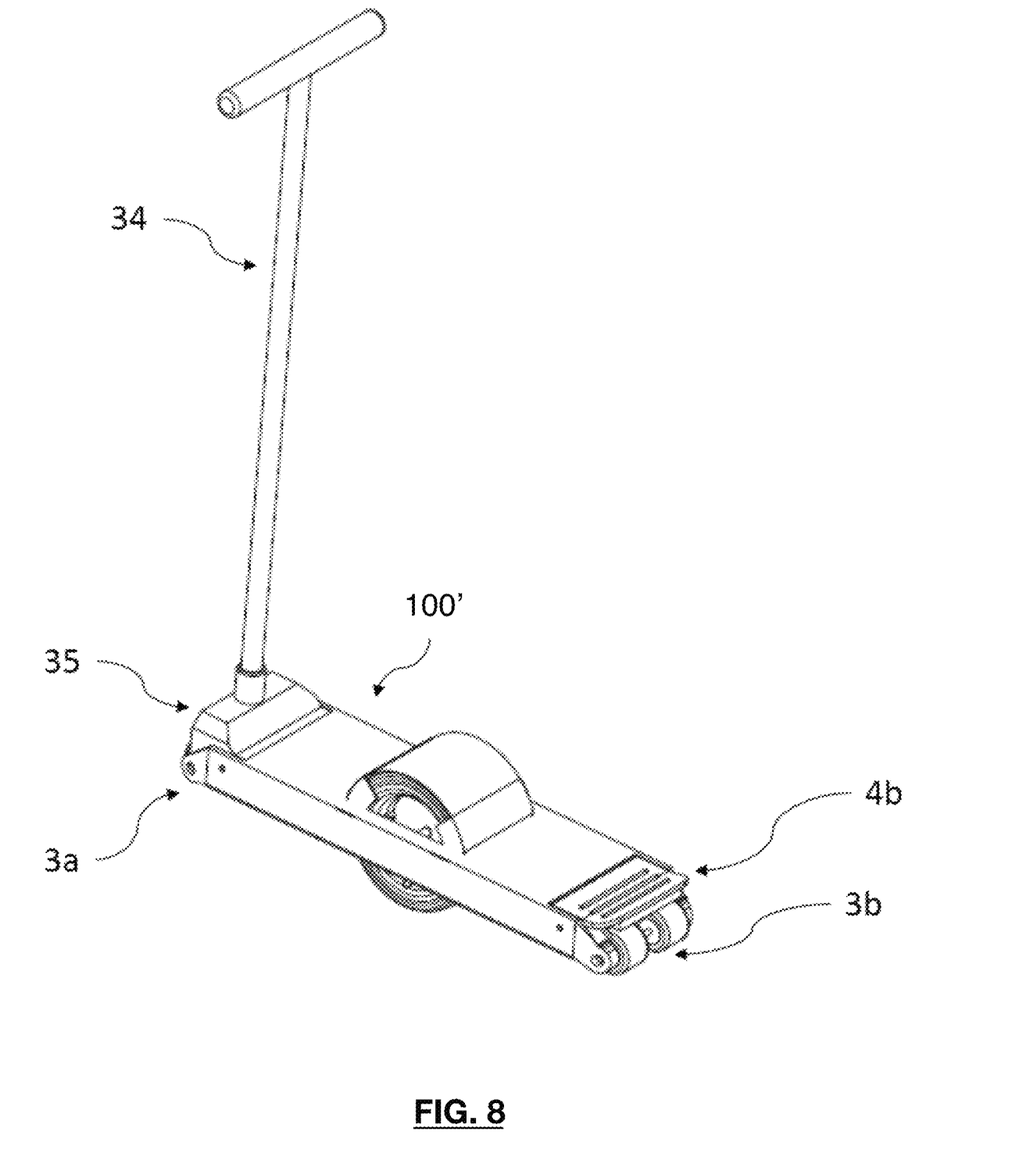
FIG. 8 is a side perspective view of an alternative configuration of the self-balancing board of FIG. 1, wherein a handlebar replaces a brake pedal.

FIG. 8 shows an alternative configuration for self-balancing board 100'. Self-balancing board 100' is similar to self-balancing board 100, except that brake pedal 4a has been removed and replaced with a handlebar bracket 35 to which a handlebar 34 is secured. Brake pedal 4b is left in place and can be operated by the rider to brake self-balancing board 100'. In this alternative configuration, first auxiliary wheel assembly 3a may also be removed.

While, in the above described embodiment, movable brake pedals that are coupled to the platform via mechanical hinges are used to engage auxiliary wheel assemblies to provide resistance to rotation of the auxiliary wheel assemblies, other types of brake elements can be employed to engages the auxiliary wheel assemblies. For example, a brake pedal can be provided via a living hinged portion of the platform, where the respective portion of the platform is suitably flexible to enable manual biasing of the brake pedal between a disengaged position and an engaged position.

Figure 9:
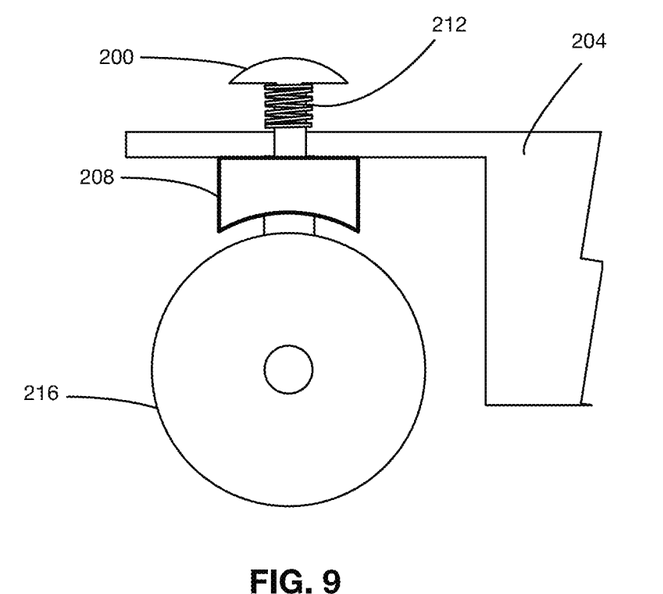
FIG. 9 is a side sectional view of a self-balancing board in accordance with another embodiment having a linearly movable auxiliary wheel assembly.

In another alternative embodiment shown in FIG. 9, the brake element is a brake actuator 200 traveling generally linearly through a bore of a platform 204 and being secured to a brake pad 208. Brake actuator 200 is biased to a disengaged position via a biasing mechanism such as spring 212 or the like in which brake pad 208 is not in contact with an auxiliary wheel assembly 216. Brake actuator 200 may be manually biased through the bore to cause brake pad 208 to engage auxiliary wheel assembly 216. Other types of brake elements that are manually movable to engage the auxiliary wheel assemblies will occur to those skilled in the art.

Figure 10:
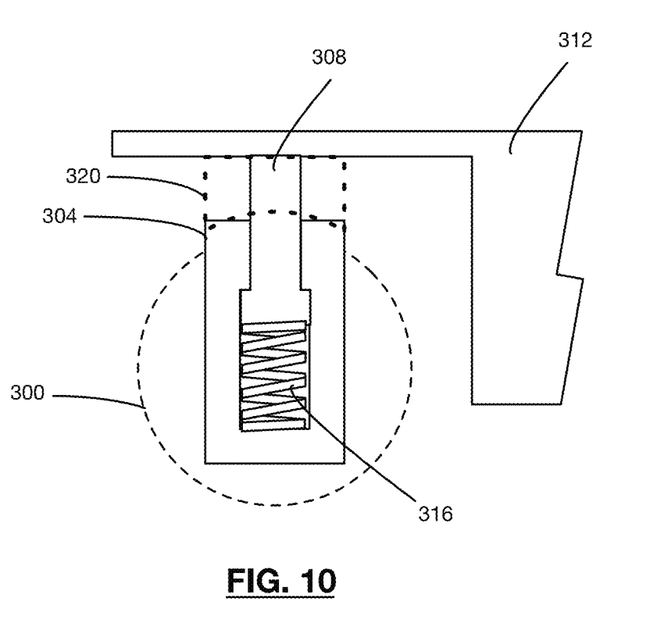
FIG. 10 is a side view of a self-balancing board in accordance with a further embodiment having a pivotally movable auxiliary wheel assembly.

An auxiliary wheel assembly can be movable towards the platform to which a brake pad may be fixed. For example, FIG. 10 shows a further alternative embodiment in which an auxiliary wheel assembly 300 is mounted on a cylinder 304 that slidably receives a post 308 secured to a platform 312. Cylinder 304 is biased away from platform 312 via a spring 316 or the like. A brake pad 320 is secured to platform 312. By manually shifting weight when auxiliary wheel assembly 300 is in contact with a surface, spring 316 can be compressed so that auxiliary wheel assembly 300 engages brake pad 320. Thus, in this case, platform 312 adjacent auxiliary wheel assembly 300 serves as the brake element.

Figure 11:
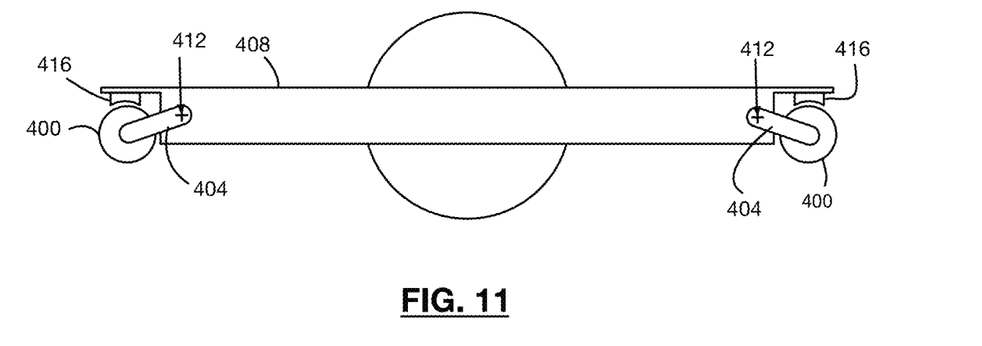
FIG. 11 is a side sectional view of a self-balancing board in accordance with another embodiment having a linearly movable brake pad.

FIG. 11 shows yet another embodiment in which an auxiliary wheel assembly 400 is connected to an auxiliary wheel support 404 which is pivotally coupled to a platform 408 so that auxiliary wheel assembly 400 can pivot about an axis 412. The orientation of auxiliary wheel support 404 is biased to urge auxiliary wheel assembly 400 away from a brake pad 416 secured to platform 408. By manually shifting weight when auxiliary wheel assembly 400 is in contact with a surface, the biasing force urging auxiliary wheel assembly 400 and brake pad 416 away from one another can be overcome so that auxiliary wheel assembly 400 engages brake pad 416. Thus, in this case, platform 408 adjacent auxiliary wheel assembly 400 serves as the brake element.

While the primary wheel assembly is shown having a single primary wheel, it will be appreciated that the primary wheel assembly can alternatively have two or more primary wheels that rotate on a common axis. The two or more primary wheels could be driven by a single motor or by individual motors.

While the auxiliary wheel assemblies are illustrated as having a single elongated wheel in the above embodiment, it will appreciated that the auxiliary wheel assembly can include two or more auxiliary wheels that are spaced laterally from one another. Further, the auxiliary wheel assemblies can include one or more cylindrical braking drums of a smaller diameter than the auxiliary wheels and against which the brake pads may be urged to provide resistance to rotation of auxiliary wheel assembly.

The above-described embodiments are intended to be examples of the present invention and alterations and modifications may be effected thereto, by those of skill in the art, without departing from the scope of the invention that is defined solely by the claims appended hereto.

What is claimed is:

1. A self-balancing board, comprising:
   a primary wheel assembly, comprising:
      a primary wheel; and
      a motor driving the primary wheel;
   a frame secured to the primary wheel assembly and having a rider support member;
   at least one sensor sensing the orientation of the platform;
   a controller receiving data from the at least one sensor and controlling the motor in response to the received data; and
   a first auxiliary wheel assembly coupled to the platform distal the primary wheel assembly, the first auxiliary wheel assembly including a first auxiliary wheel that is elevated from contacting a flat surface upon which the primary wheel rests when the foot deck is parallel to the flat surface, and being engaged with the flat surface upon which the primary wheel rests when the foot deck is tilted by a selected angle, so as to cooperate with the primary wheel to support the self-balancing board on the flat surface without triggering braking by the controller on the primary wheel,
   wherein the first auxiliary wheel overlaps at least a portion of the primary wheel in a lateral direction and extends laterally across a longitudinal centerline of the primary wheel.

2. The self-balancing board of claim 1, further comprising:
   a first brake pedal being biased to a disengaged position and being movable to an engaged position in which the first brake element contacts the first auxiliary wheel assembly.

3. The self-balancing board of claim 2, wherein the first brake pedal is coupled to the platform via a mechanical hinge.

4. The self-balancing board of claim 2, wherein the first brake pedal is coupled to the platform via a living hinge.

5. The self-balancing board of claim 1, wherein the first brake element comprises a first brake pad, the first brake element being linearly biased away from the first auxiliary wheel assembly, and wherein the first brake element can be manually urged towards the first auxiliary wheel assembly to cause the first brake pad to come into contact with the first auxiliary wheel assembly.

6. The self-balancing board of claim 1, wherein the first auxiliary wheel assembly is biased away from the platform, and wherein pressure applied to the platform proximal to the first auxiliary wheel assembly when the first auxiliary wheel assembly urges the first auxiliary wheel assembly into contact with the first brake element.

7. The self-balancing board of claim 1, wherein the first auxiliary wheel assembly comprises:
   a first auxiliary wheel; and
   a first braking surface.

8. The self-balancing board of claim 7, wherein the first brake element engages the first braking surface to provide resistance to rotation of the first auxiliary wheel assembly.

9. The self-balancing board of claim 8, wherein the second brake element comprises a second brake pad, the second brake element being linearly biased away from the second auxiliary wheel assembly, and wherein the second brake element can be manually urged towards the second auxiliary wheel assembly to cause the second brake pad to come into contact with the second auxiliary wheel assembly.

10. The self-balancing board of claim 8, wherein the second auxiliary wheel assembly is biased away from the platform, and wherein pressure applied to the platform proximal to the second auxiliary wheel assembly when the second auxiliary wheel assembly urges the second auxiliary wheel assembly into contact with the second brake element.

11. The self-balancing board of claim 1, further comprising:
   a second auxiliary wheel assembly coupled to the platform distal the primary wheel assembly, the second auxiliary wheel assembly being elevated from contacting the flat surface when the foot deck is parallel to the flat surface; and
   a second brake element that is manually movable relative to the second auxiliary wheel assembly to engage the second auxiliary wheel assembly to provide resistance to rotation of the second auxiliary wheel assembly.

12. The self-balancing board of claim 11, further comprising:
   a second brake pedal being biased to a disengaged position and being movable to an engaged position in which the second brake element contacts the second auxiliary wheel assembly.

13. The self-balancing board of claim 12, wherein the second brake pedal is coupled to the platform via a mechanical hinge.

14. The self-balancing board of claim 12, wherein the second brake pedal is coupled to the platform via a living hinge.

15. The self-balancing board of claim 1, further comprising a handle bar secured to the platform.

16. The self-balancing board of claim 1, wherein the first auxiliary wheel assembly is positioned proximate a front end of the platform, and wherein the self-balancing board further comprises:
   a second auxiliary wheel assembly coupled to the platform proximate a rear end of the platform, the second auxiliary wheel assembly being elevated from contacting the flat surface when the foot deck is parallel to the flat surface, and being engaged with the flat surface upon which the primary wheel rests when the foot deck is tilted by a selected angle, so as to cooperate with the primary wheel to support the self-balancing board on the flat surface.

17. The self-balancing board of claim 16, further comprising a second brake element that is manually movable relative to the second auxiliary wheel assembly to engage the second auxiliary wheel assembly to provide resistance to rotation of the second auxiliary wheel assembly.

18. The self-balancing board of claim 16, wherein, during engagement of the second auxiliary wheel assembly with the flat surface the controller decelerates the primary wheel.

19. A self-balancing board, comprising:
   a primary wheel assembly, comprising:
      a primary wheel; and
      a motor driving the primary wheel;
   a frame secured to the primary wheel assembly and having a rider support structure;
   at least one sensor sensing the orientation of the platform;
   a controller receiving data from the at least one sensor and controlling the motor in response to the received data;
   a first auxiliary wheel assembly coupled to the platform distal the primary wheel assembly, the first auxiliary wheel assembly being elevated from contacting a flat surface upon which the primary wheel rests when the foot deck is parallel to the flat surface, and being engaged with the flat surface upon which the primary wheel rests when the foot deck is tilted by a selected angle, so as to cooperate with the primary wheel to support the self-balancing board on the flat surface without triggering braking by the controller on the primary wheel; and
   a first brake element that is manually movable relative to the first auxiliary wheel assembly to engage the first auxiliary wheel assembly to provide resistance to rotation of the first auxiliary wheel assembly.

\* \* \* \* \*